United States Patent [19]

Inomata et al.

[11] Patent Number: 4,969,057
[45] Date of Patent: Nov. 6, 1990

[54] FLOPPY DISC DRIVE APPARATUS FOR PREVENTING ABSORPTION BETWEEN A HEAD AND A FLOPPY DISC

[75] Inventors: Shunji Inomata; Tamotsu Wakabayashi; Hideyasu Mori, all of Tokyo, Japan

[73] Assignee: Kabushiki Kaisha Toshiba, Kawasaki, Japan

[21] Appl. No.: 143,173

[22] Filed: Jan. 13, 1988

[30] Foreign Application Priority Data

| Jan. 13, 1987 | [JP] | Japan | 62-5659 |
| Jan. 13, 1987 | [JP] | Japan | 62-5660 |
| Jan. 12, 1988 | [JP] | Japan | 63-4546 |
| Jan. 12, 1988 | [JP] | Japan | 63-4547 |

[51] Int. Cl.$^5$ .................... G11B 5/54; G11B 21/02
[52] U.S. Cl. .................... 360/75; 360/69; 360/74.1; 360/105
[58] Field of Search .............. 360/69, 71, 74.1, 75, 360/78.04, 103, 105, 106, 78.13, 47.01, 99.01–99.04

[56] References Cited

U.S. PATENT DOCUMENTS 4,593,329 6/1986 Hayakawa .................... 360/75

FOREIGN PATENT DOCUMENTS 61-85680 5/1986 Japan .................... 360/69
61-160878 7/1986 Japan .................... 360/74.1

Primary Examiner—Alan Faber
Assistant Examiner—Steven R. Garland
Attorney, Agent, or Firm—Finnegan, Henderson, Farabow, Garrett and Dunner

[57] ABSTRACT

The present invention relates to a system (FDD) for driving such a magnetic disc as a floppy disc, in which, in a stand-by mode where recording or reproducing operation is not carried out, a magnetic head is moved to a track position in the vicinity of the innermost peripheral part of the disc or the disc is intermittently rotably driven so that an adsorbent phenomenon can be prevented from taking place between the magnetic head and the disc and even in the case of occurrence of such a adsorbent phenomenon, the magnetic head or disc can be easily released from such adsorbent binding, thus preventing any destruction of information recorded on the disc.

9 Claims, 8 Drawing Sheets

FLOPPY DISC DRIVE APPARATUS FOR PREVENTING ABSORPTION BETWEEN A HEAD AND A FLOPPY DISC

BACKGROUND OF THE INVENTION

1. Field of the Invention

The present invention relates to a magnetic disc drive system which prevents the damage of data recorded on such a magnetic disc as a floppy disc by an adsorbent phenomenon of a magnetic head when the recording and reproducing operations of the head are stopped.

2. Description of the Prior Art

Recently, a floppy disc drive system (hereinafter, which is referred to merely as the FDD) has been widely employed in a backup memory of a telephone exchange system, a word processor and so on. In the conventional FDD, a magnetic head is stopped at its initial stage at the outermost periphery of a floppy disc (hereinafter, which will be referred to merely as the disc) and during stoppage of the recording or reproducing operation, the magnetic head remains on a track on the disc at the corresponding position. For this reason, the conventional FDD has had such a problem that when the magnetic head and the disc are left under high temperature and high humidity conditions for a certain period of time, the magnetic head tends to adhere to the disc, that is, a so-called adsorbent or adhesive phenomenon tends to take place, which results undesirably in that information stored on the disc is destroyed or a rotary drive device cannot rotate the disc.

Most FDDs, which use a disc having a diameter of, for example, 3.5 inches, are not equipped with such a head loading mechanism as loads and unloads the disc with the magnetic head (connects and disconnect the magnetic head to and from the disc) for the purpose of miniaturization of the FDD. For this reason, in the 3.5-inch FDD, when the recording or reproducing operation has been ended, the magnetic head remains stopped at the then track position in a contact relation with the disc to ready for the next operation, which further increases the possibility of occurrence of the adsorbent phenomenon.

Especially in a PBX (private branch exchange) or a key telephone system which uses the aforementioned FDD as a memory backup device in case of power failure, the FDD is used to store exchange programs and customer data (abbreviated dialling numbers, ID codes and so on to be registered by users). In this respect, the FDD is driven only when it is necessary to rewrite the customer data and the disc is usually left in its loaded condition, i.e., loaded in the FDD for a long period of time, which leads to a much increased danger of occurrence of the disc adsorbent phenomenon.

The mechanism of the adsorbent phenomenon is not clear yet, but it is generally considered that under high temperature and high humidity conditions, surface active agent coated on the surface of a disc increases its fluidity and starts to flow into a contact area between the disc and a magnetic head by the capillary action, whereby the magnetic head adheres to the disc. And when the adsorbent or adhesive force exceeds a starting torque of a disc driving motor, the disc motor cannot rotably drive the disc or the disc is subjected to an unreasonable force on its surface on which data are recorded, leading to the destruction of the data.

SUMMARY OF THE INVENTION

It is, therefore, an object of the present invention to provide a floppy disc drive system which prevents an adsorbent phenomenon between a disc and a magnetic head to reliably avoid the destruction of data recorded on the disc and the erroneous operation of a disc motor.

In accordance with an aspect of the present invention, there is provided a magnetic disc drive system which comprises a recording medium for storing therein data, a magnetic head through which data are written in and read out from the recording medium, first means for rotably driving the recording medium, second means for drivingly moving the magnetic head in a radial direction of the recording medium, and control means for, in a stand-by mode in which the data is not written nor read, stopping the driving operation of the first driving means and also for controllably driving the second driving means to move the magnetic head to a predetermined track in the vicinity of the innermost peripheral track of the recording medium.

With such an arrangement, when the FDD is in a stand-by mode in which the recording or reproducing operation is stopped, the control means drives the second driving means which in turn drivingly moves the magnetic head in the radial direction (usually, in the centripetal direction) of the recording medium and positions the magnetic head, for example, at the innermost peripheral track of the medium.

Since the innermost peripheral part of the recording medium has a low possibility that information is recorded in the innermost part, the destruction of the information can be minimized. In addition, even when an adsorbent phenomenon takes place between the magnetic head and the recording medium, the magnetic head can be released with a small torque from the adsorbent bound condition because the magnetic head is located at the nearest distance from a rotary shaft of the first driving means.

Further, in accordance with another aspect of the present invention, there is provided a magnetic disc drive system which comprises a disc-shaped recording medium for storing therein data, a magnetic head through which data are written in and read out from the recording medium, first driving means for rotably driving recording medium, second driving means for drivingly move said magnetic head in a radial direction of the recording medium, and control means for, in a stand-by mode in which the data is not written nor read out, causing the second driving means to stop its driving operation and the first driving means to rotably drive intermittently at intervals of a predetermined time.

With the aforementioned arrangement, the disc is rotated intermittently during stoppage of recording or reproducing operation of the FDD so that the magnetic head can be prevented from coming into a long and continuous contact with the disc at its identical part, thus preventing the destruction of information recorded on the recording medium by an adsorbent phenomenon between the magnetic head and the disc.

DESCRIPTION OF THE PREFERRED EMBODIMENTS

Figure 2:
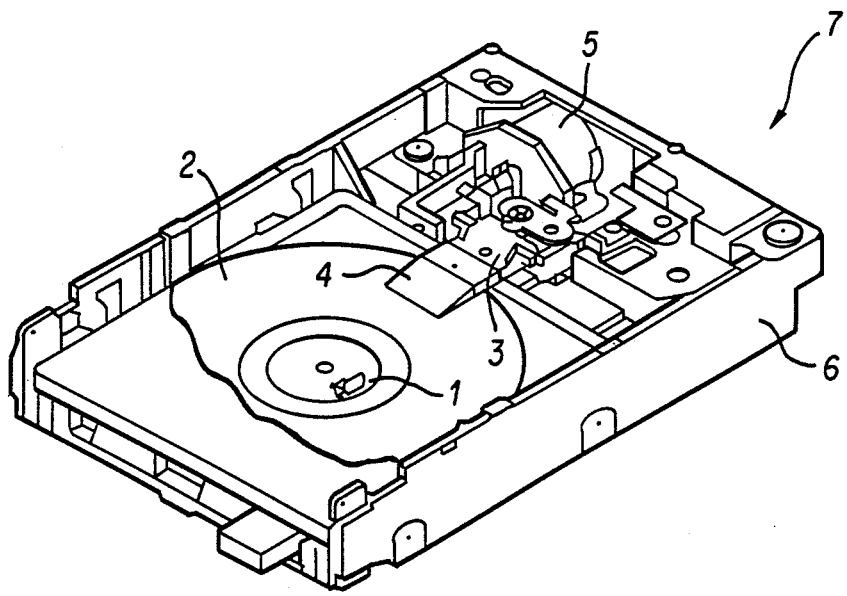
FIG. 2 is a perspective view of an inside appearance arrangement of an FDD.
Figure 3:
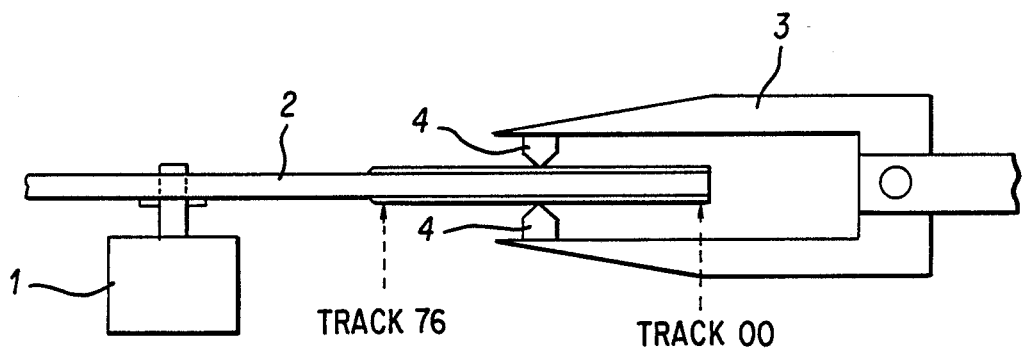
FIG. 3 is a cross-sectional view of the FDD.

FIG. 2 shows an inside perspective arrangement of an FDD 7 using a 3.5-inch disc, while FIG. 3 is a cross-sectional view thereof.

In FIGS. 2 and 3, a magnetic head 4 is mounted on a carriage 3 so that the movement of the carriage 3 in a radial direction of a disc 2 through a worm gear (not shown) by a motor 5 causes the radial movement of the magnetic head 4. Provided in the center of the disc 2 is a disc motor 1 which rotably drives the disc 2. These constituent elements are housed in a body casing 6. This 3.5inch FDD is not equipped with a head loading mechanism which functions to connect and disconnect the magnetic head 4 to and from the disc 2 as mentioned above.

Figure 1:
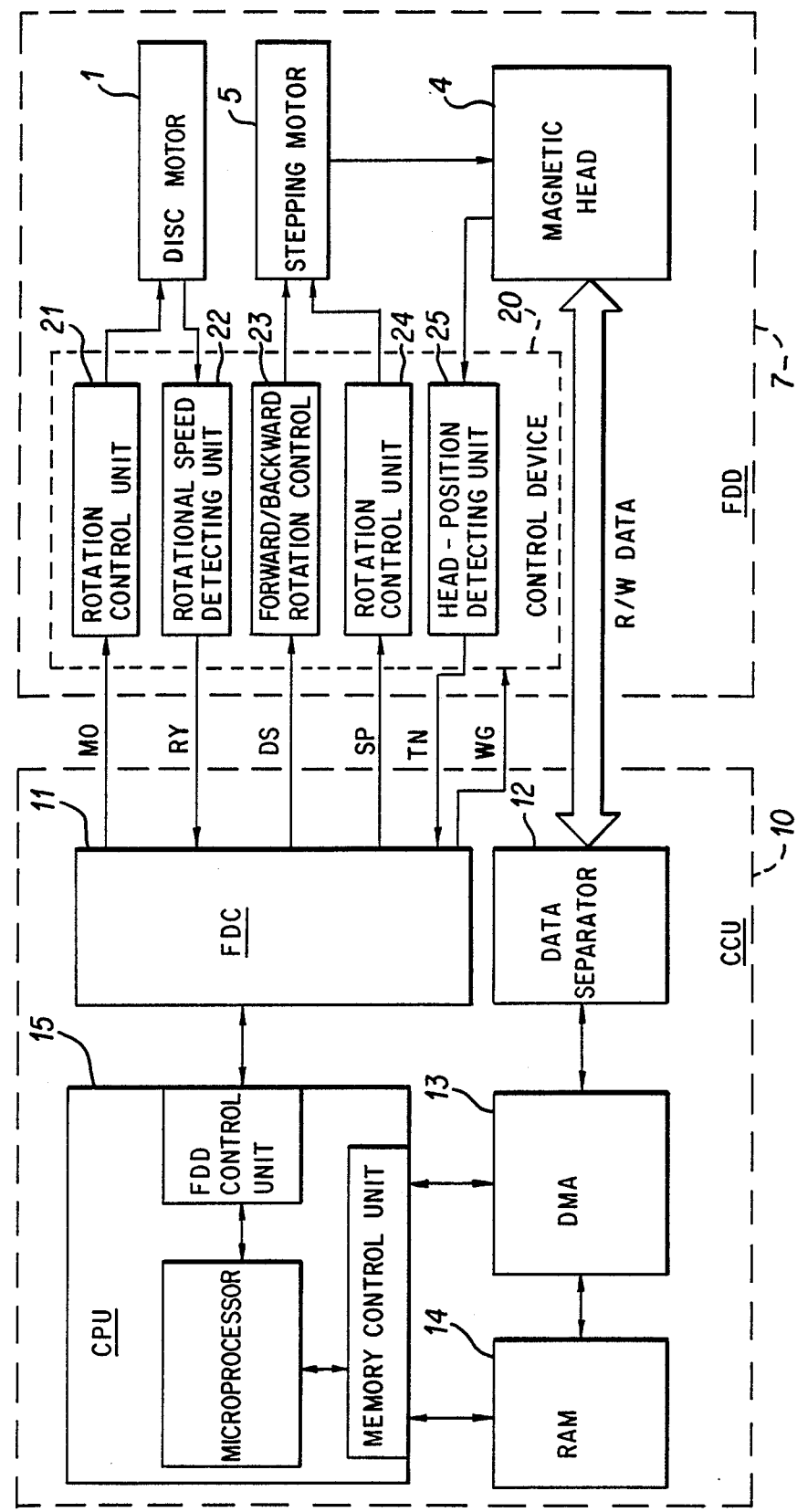
FIG. 1 is a block diagram showing a first embodiment of the present invention.

There is shown in FIG. 1 an arrangement of a first embodiment of the present invention which comprises the FDD 7 and a central control unit (CCU) 10 which transfers signals to and from the FDD 7. The FDD 7 includes not only the disc motor 1, step motor 5 and magnetic head 4 mentioned above but also a control device 20 which controls these elements. The control device 20 includes a rotation control unit 21 for controlling the rotation and stoppage of the disc motor 1, a rotational speed detecting unit 22 for detecting the rotational speed of the disc motor 1, a forward/backward rotation control unit 23 for controlling the forward and backward rotation of the stepping motor 5, a rotation control unit 24 for controlling the rotation and stoppage of the stepping motor 5, and a head-position detecting unit 25 for detecting the track position of the magnetic head 4. Note that a track indicates a radial position on the disc 2 and the outermost track is referred to as a track 00 and the innermost track is referred to as a track 76 herein (refer to FIG. 3).

On the other hand, the CCU 10 includes a floppy disc controller (FDC) 11 for transferring signals to and from the control device 20 of the FDD 7, a data separator 12 for separating a data signal from a clock pulse and modulating it, a RAM 14, a direct memory access (DMA) 13 for transferring read/write (R/W) data to the RAM 14 and a CPU 15.

Many sorts of signals are transferred between the FDC 11 and the control device 20 but among them only signals concerning the present invention are explained in the following.

"MOTOR ON" (hereinafter, which will be abbreviated as MO)

This is a signal for stopping and rotating the disc motor 1 when it has a value of "1" and a value of "0" respectively.

"DIRECTION SELECT" (hereinafter, which will be abbreviated as DS)

This is a signal for rotating the stepping motor 5 forwardly and backwardly, that is, for determining whether or not the magnetic head 4 is moved in a radially inward or outward direction of the disc. When the signal has a value of "1", the magnetic head 4 is moved in the radially inward direction, while when the signal has a value of "0", the magnetic head is moved in the radially outward direction respectively.

"STEP" (hereinafter, which will be abbreviated as SP)

This signal determines the amount of movement of the magnetic head 4 in the disc radial direction. When this signal has one pulse, the magnetic head is shifted by one track and when the signal has three pulses, the magnetic head is shifted by three tracks.

"WRITE GATE" (hereinafter, which will be abbreviated as WG)

When this signal has a value of "1", a write circuit (not shown) in the control device 20 is put in its operative condition, whereas when the signal has a value of "0", the drive is put in a write inhibit mode.

"READY" (hereinafter, which will be abbreviated as RY)

This is a signal which is applied from the rotational speed detecting unit 25 to the FDC 11. When the signal has a value of "1", this indicates that the disc 2 has been inserted and the rotational speed of the disc motor 1 has reached at a constant level.

"TRACK NO" (hereinafter, which will be abbreviated as TN)

This is a signal which is applied from the head position detecting unit 25 to the FDC 11. The head position detecting unit 25 detects a position or track position of the magnetic head 4 in the disc radial direction and outputs a signal TN indicative of the detected track number. This head position detecting unit 25 has been newly added in the present embodiment to form an essential part of the present invention.

Figure 4:
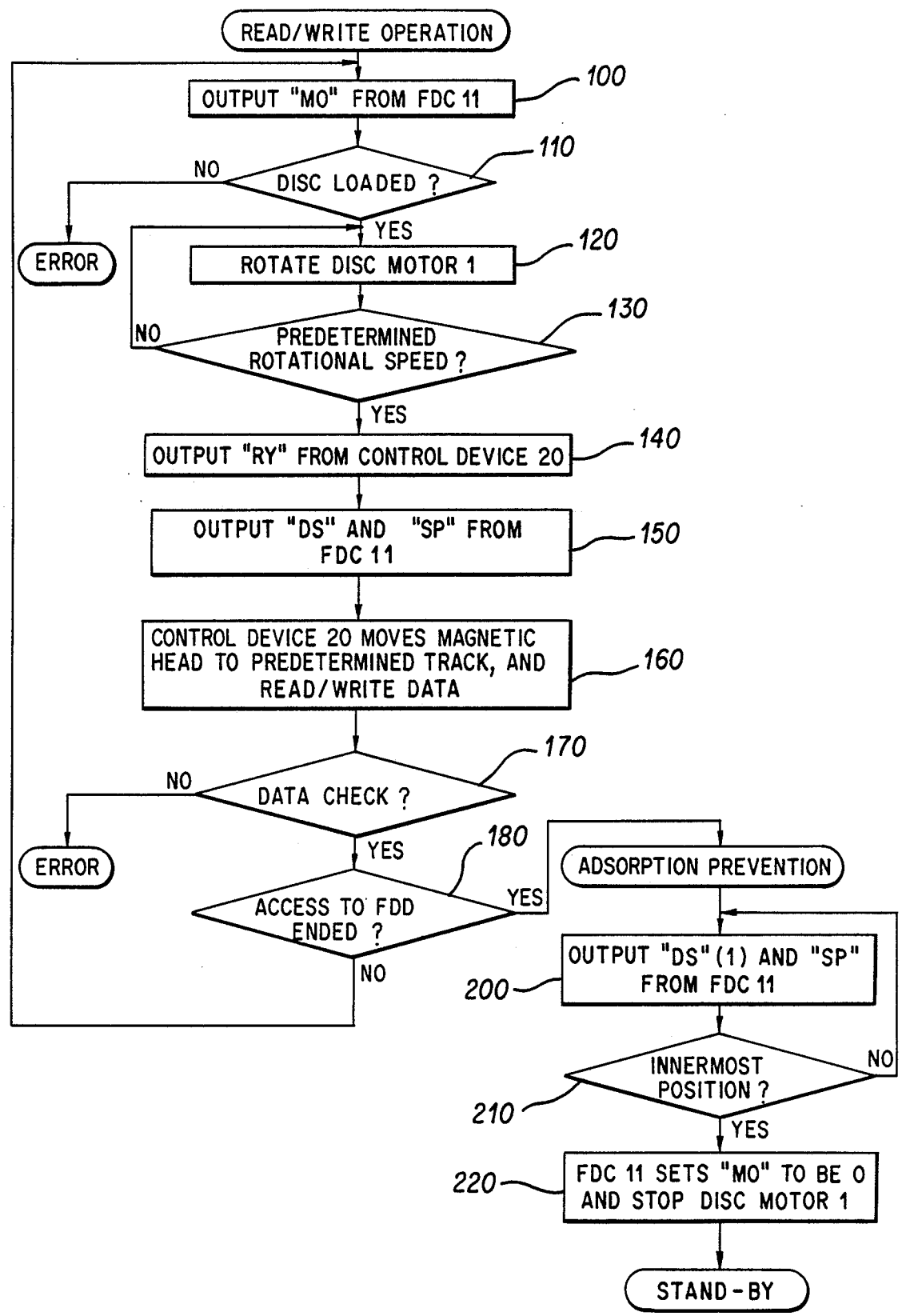
FIG. 4 is a flowchart for explaining the operation of the first embodiment.

The operation of the arrangement shown in FIG. 1 will be explained by referring to a flowchart of FIG. 4. This flowchart comprises usual read/write operation routine (steps 100 to 180) added with an anti-adsorption routine (steps 200 to 220).

In the read/write operation, the FDC 11 of the CCU 10 first outputs a signal MO (step 100). The control device 20 of the FDD 7 confirms that the disc 2 has been loaded and then controls to cause the rotation control unit 21 therein to rotably drive the disc motor 1 (step 120). When the rotational speed detecting unit 22, which is detecting the rotational speed of the disc motor 1, detects a predetermined rotational speed, the control device 20 outputs a signal RY (steps 130 and 140).

The FDC 11, when receiving this signal RY, outputs signals DS and SP to move the magnetic head 4 to a predetermined track. And in the read operation, the CPU 15 writes into the RAM 14 through the DMA 13 the read data applied to the data separator 12. In the write operation, data stored in the RAM 14 is transferred to the magnetic head 4 through the DMA 13 and the data separator 12 to be written into the disc 2 (step 160). Thereafter, the CPU 15 checks the data and confirms that there is no abnormality (step 170).

At this stage, the magnetic head 4 is located at a track position where aforementioned access (read/write) has been carried out, and comes into contact with the disc 2 at that position. In the conventional read/write operation, after this, the CPU 15 sets the signal MO to be 0 and stops the disc motor 1, after which the magnetic head 4 is put in its stand-by state with the head brought into contact with the disc at the above track position during the accessing operation. In the present embodiment, however, the following anti-adsorption routine are executed.

More specifically, the CPU 15 confirms the completion of the accessing operation (read/write operation) to the FDD (step 180) and then first judges or determines the current track position of the magnetic head 4 on the basis of the output TN of the head position detecting unit 25. And on the basis of the determined head position, the CPU 15 calculates the number of pulses in the signal SP necessary to move the magnetic head 4 to the innermost peripheral track (refer to track 76 in FIG. 3). As has been already mentioned above, the number of pulses in the signal SP corresponds to the number of tracks crossed.

And the CPU 15 orders the FDC 11 to transfer the signal of "1" to the forward/backward rotation control unit 23 and also to transfer the signal SP having said calculated number of pulses to the rotation control unit 24 (step 200). This causes the control unit 23 and the rotation control unit 24 to drive the stepping motor 5, which results in that the magnetic head is moved in the radially inward direction of the disc and finally positioned at the innermost peripheral track (track 76). The CPU 15 confirms on the basis of the output TN of the head position detector 25 that the magnetic head 4 has been located at the innermost peripheral track position (step 210). After this confirmation, the CPU 15 controls to cause the FDC 11 to set the signal MO to be "0", thus stopping the disc motor 1 (step 220) and subsequently putting the system in the stand-by mode.

In accordance with the presnt embodiment, when the FDD does not perform information recording and reproducing operations over the disc 2, the magnetic head 4 is located at the innermost peripheral part of the disc 2 where there is a low possibility that information is recorded. As a result, even if the magnetic head 4 is stopped at that position for a long period of time and adsorbent phenomenon takes place between the magnetic head 4 and the disc 2, the destruction of the information can be reduced to the minimum extent. In particular, such important data as formats recorded in the outermost peripheral part of the disc can be completely prevented from being destroyed.

In addition, even if the occurrence of such an adsorbent phenomenon between the magnetic head 4 and the disc 2 leads to the fact that the magnetic head 4 adheres to the disc 2, the magnetic head can be released from the adsorbent binding with the minimum torque, because such an adhesive position is located nearest to the rotary shaft of the disc motor 1. A moment J of inertia at a given point on the disc 2 is expressed by the following equation.

$$J = mr^2/2$$

where, m is mass and r is radius. It will be appreciated from the above equation that a torque proportional to the second power of radius is necessary to release the magnetic head 4 from the adsorbent binding force and thus it is less advantageous to locate the magnetic head farther from the rotary shaft of the motor 1.

Although the magnetic head has been retreated to the innermost peripheral track in the foregoing embodiment, the present invention is not limited to the particular one and the magnetic head may be retreated to an arbitrary track in the vicinity of the innermost peripheral track.

Figure 5:
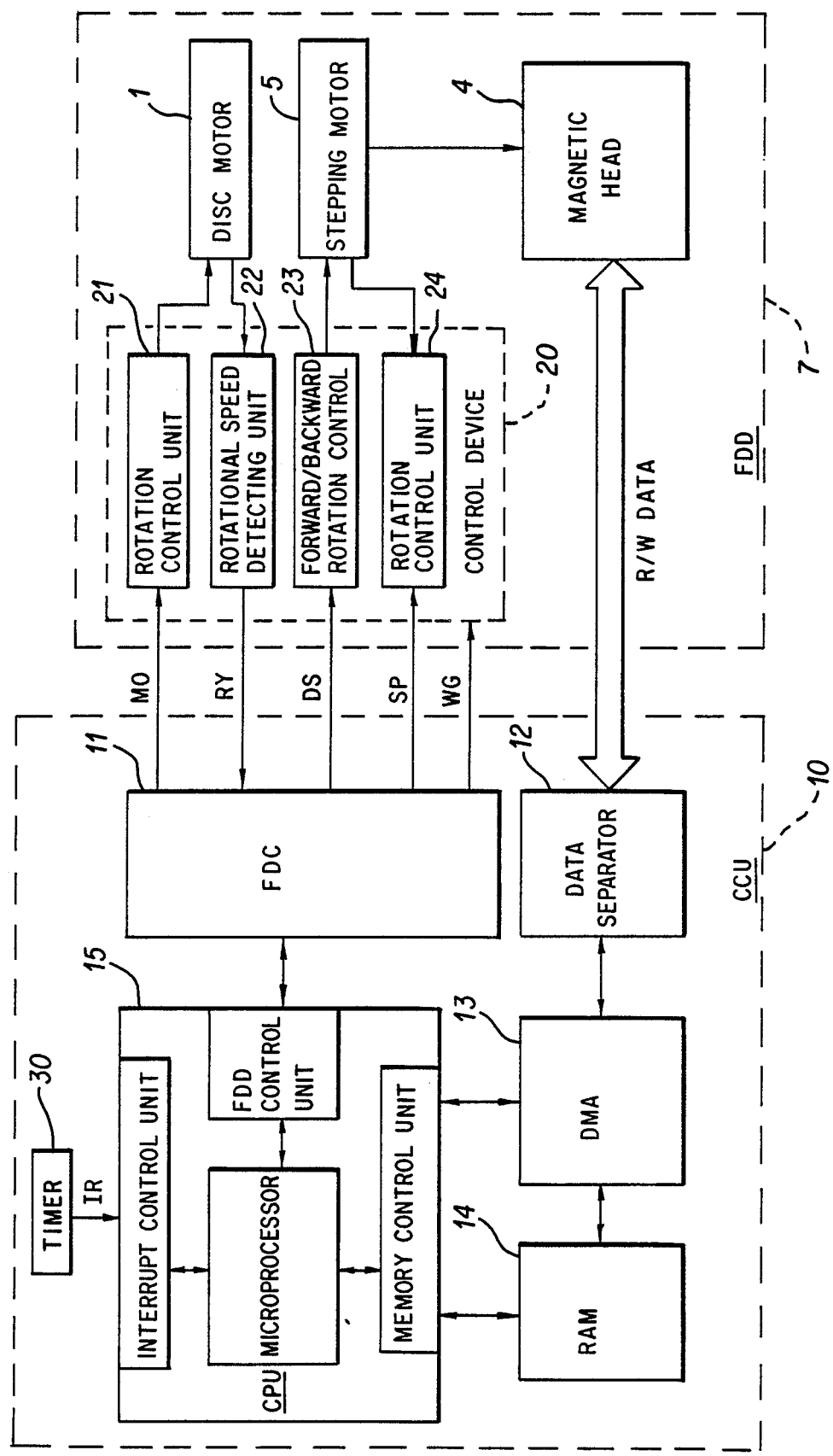
FIG. 5 is a block diagram showing a second embodiment of the present invention.

Referring now to FIG. 5, there is shown a second embodiment of the present invention, in which the same constituent elements as those in FIG. 1 are denoted by the same reference numerals.

In the arrangement of FIG. 5, the head postion detecting unit 25 in FIG. 1 is omitted and a timer 30 is newly added in the CCU 10.

The timer 30 is provided to measure a predetermined time period (for example, one hour) and functions to apply an interrupt signal IR to the CPU 15 each time the above predetermined time elapses.

Figure 6:
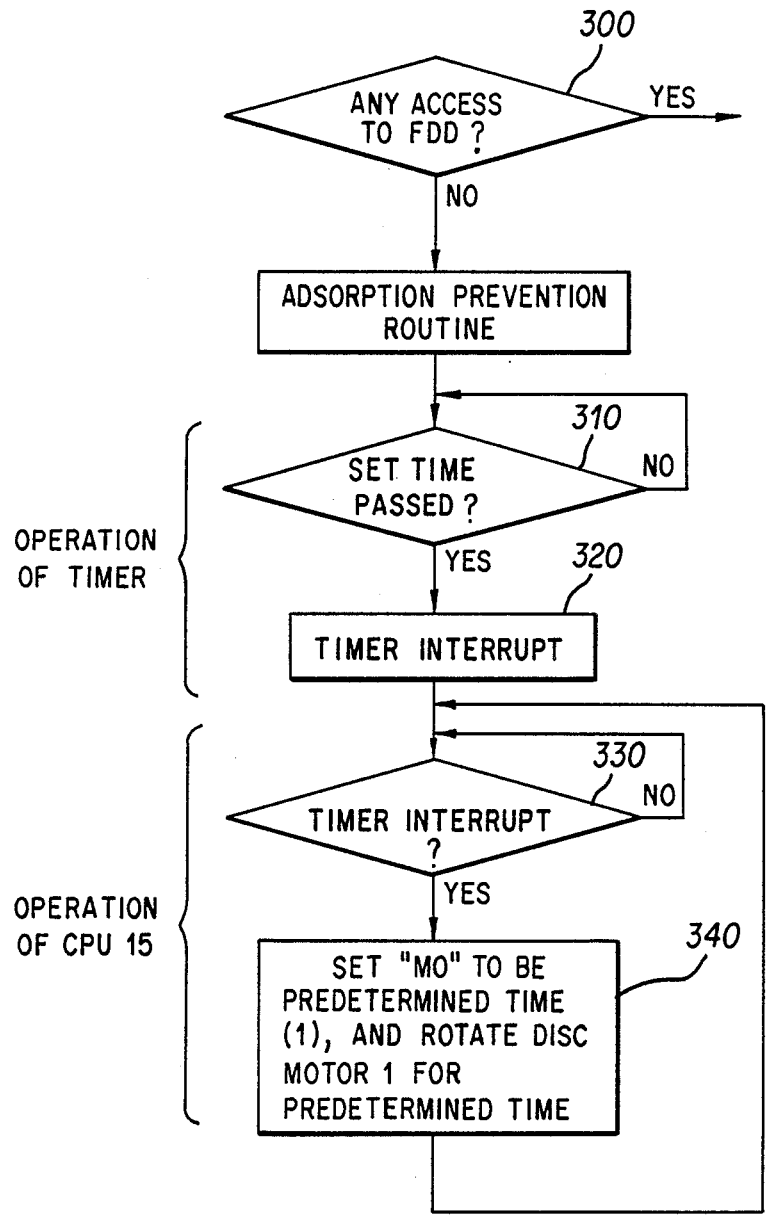
FIG. 6 is a flowchart for explaining the operation of the first embodiment.

Explanation will be made as to the operation of the second embodiment with reference to a flowchart of FIG. 6.

There is no accessing operations to the FDD in such occasions that, for example, when the disc 2 is in its initial state where the disc 2 is set in the casing 6 and no recording or reproducing operation has taken place yet, or when the magnetic head 4 is standing by at a track on the disc 2 after the completion of a recording or reproducing operation. When it is judged at the step 300 that there is no accessing operations to the FDD, the CPU 15 executes the following anti-adsorption routine.

That is, the timer 30, when measuring the predetermined time (step 310), applies the interrupt signal IR to the CPU 15 (step 320).

Figure 7:
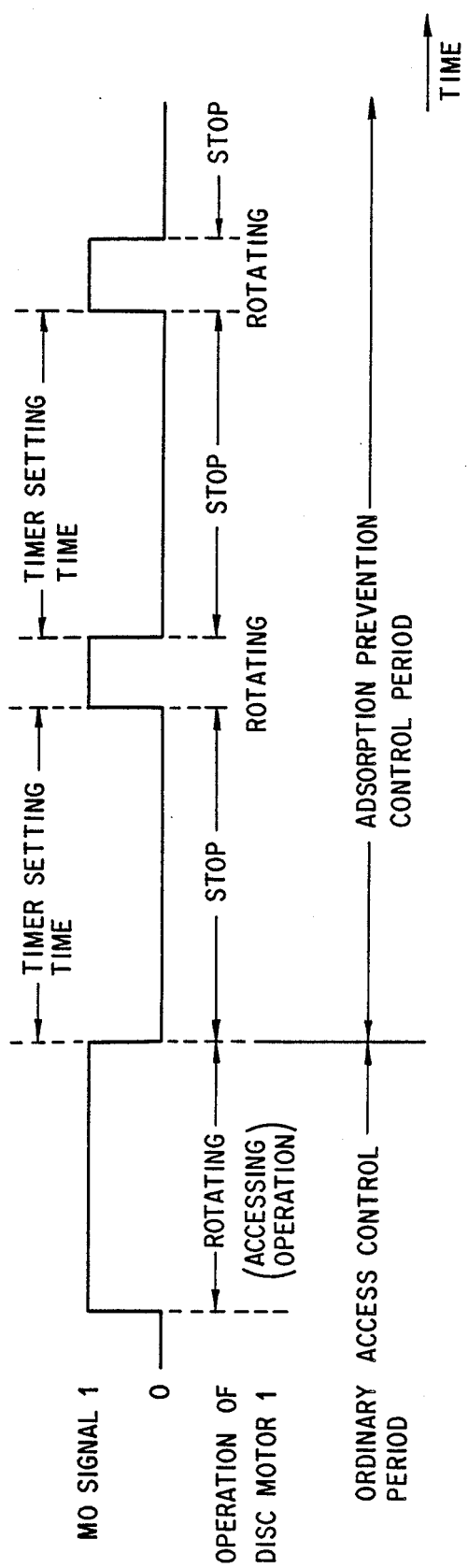
FIG. 7 is a timing chart showing the rotational state of a disc in a stand-by mode of the second embodiment.

The CPU 15 is arranged to receive the interrupt signal IR from the timer 30 under the control of the interrupt control unit only when there is no accessing operation to the FDD. The CUP 15, when detecting the interrupt signal IR (step 330), orders the FDC 11 to set the signal MO to be "1" for a short period of time. This causes the rotation control unit 21 to rotate the disc motor 1 for a time period during which the signal MO has a value of "1", thus turning the disc 2 for a predetermined time and then stopping the disc (step 340). The CPU 15 repetitively executes such control time the CPU receives the interrupt signal from the timer 30. As a result, the disc 2 is intermittently rotated as shown in FIG. 7 under such condition that the magnetic head 4 is positioned at a certain track. That is, in the case of the system not provided with a head loading mechanism, when access to the FDD is ended to enter the system in the stand-by mode, the magnetic head 4 stays at that track position where access has been completed, with the magnetic head being in contact with the disc. In the present invention, on the other hand, the disc motor 1 is intermittently rotated to intermittently run the magnetic head 4 on that track in such a stand-by mode In accordance with the present embodiment, in the initial state and in the stand-by mode in which the recording or reproducing operation has been ended, the disc 2 is intermittently rotably driven. As a result, it can be prevented that the magnetic disc 4 continues to come into contact with the same part of the disc 2 for a long period of time, that an adsorbent phenomenon takes place between the magnetic head 4 and the disc 2 and that information stored in the disc 2 is destroyed.

The time set in the timer 30 is not restricted to the particular one and may be properly selected depending on the disc 2 and the ambient conditions.

Figure 8:
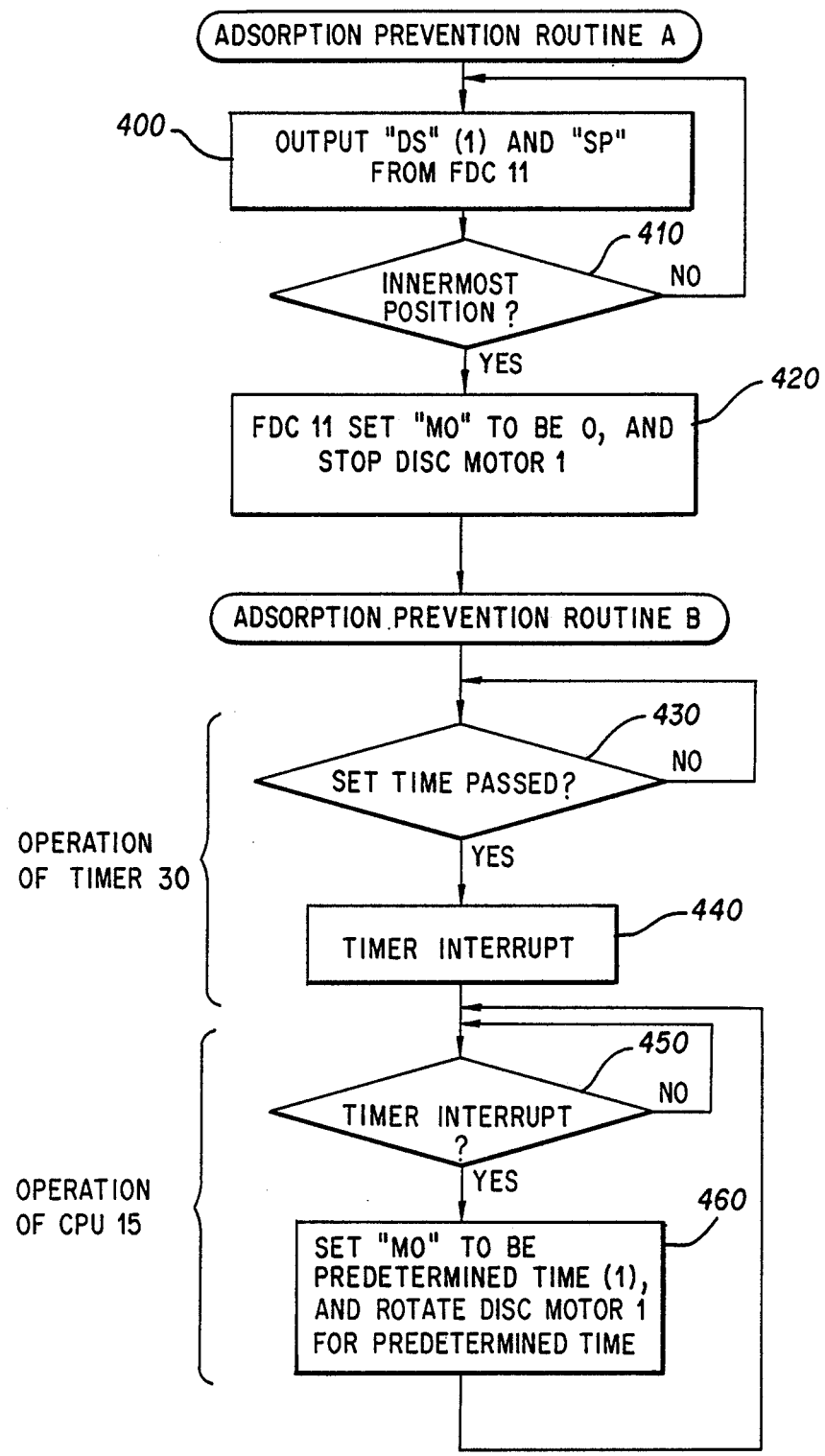
FIG. 8 is a flowchart for explaining the operation of a third embodiment of the present invention.

A third embodiment of the present invention will next be explained by referring to a flowchart of FIG. 8.

The third embodiment corresponds to a combination of the first second embodiments. That is, the flowchart of FIG. 8 comprises a routine A (steps 400 to 420)

which corresponds to the first embodiment and a routine B (steps 430 to 460) which corresponds to the second embodiment.

More specifically, when the third embodiment is in the stand-by or initial mode, the stepping motor 5 is first driven to move the magnetic head 4 to the innermost peripheral part of the disc 2 and then the disc motor 1 is driven to intermittently rotate the disc 2.

In the third embodiment, since the magnetic head 4 is positioned at the innermost peripheral part where there is a low possibility that information is recorded and the disc 2 is intermittently driven along the innermost peripheral track, the adsorbent phenomenon occurs much less. Occurrence of such adsorbent phenomenon enables the disc to be released from the adsorbent force with a small torque, and the information destruction can be supressed to the minimum extent.

Figure 9:
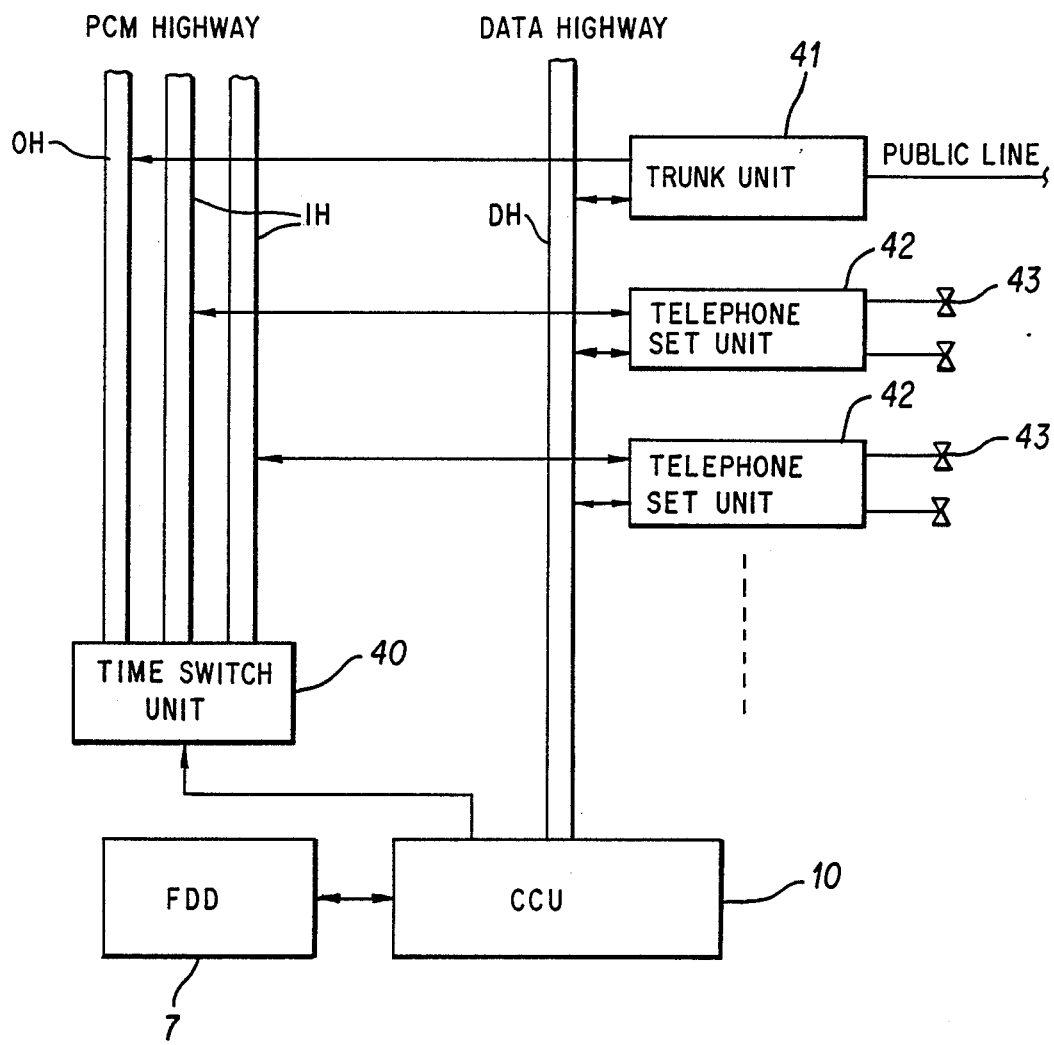
FIG. 9 is a block diagram of an example of arrangement to which the present invention is applied to a digital telephone exchange system.

Shown in FIG. 9 is an arrangement of a digital key telephone exchange system to which the present invention is applied and wherein the FDD 7 is used as a backup memory in case of power failure.

This digital telephone exchange system comprises, in addition to such a central control unit (CCU) and an FDD 7 as mentioned above, a time switch 40 which exchanges interconnections between inner line or extension highways IH and between an outer line highway OH and the extension highway IH, a trunk unit 41 as an outer line interface, telephone set units 42 as extension interfaces, terminals 43 comprising, for example, telephone sets, and a data highway DH.

In this telephone exchange system, exchange programs and customer data (such as abbreviated telephone numbers) are rocorded on the disc of the FDD 7 and these recorded data are read out at the time of installing or starting the exchange system to be transferred to the RAM of the CCU 10. For this reason, in the exchange system, in other cases than when it becomes necessary to again transfer the recorded data due to power failure and when it becomes necessary to rewrite the customer data by users, the FDD is in the stand-by mode and thus there is a much high possibility of occurrence of the aforementioned adsorbent phenomenon.

Therefore, the FDD 7 and CCU 10 of this exchange system are provided with such arrangement and function for preventing the adsorbent phenomenon as shown in FIGS. 1 and 5, thereby avoiding any destruction of the recorded data.

The present invention is not limited to the foregoing digital telephone exchange system and may be applied to such an arbitrary electronic apparatus and equipment as a word processor, a PBX and so on.

What is claimed is:

1. A floppy disc drive apparatus having an absorption preventing function for preventing absorption between a head and a surface of a floppy disc, wherein the head is in contact with the surface of the floppy disc when the floppy disc is driven, the floppy disc including data tracks and a non-data region located at an inner diameter portion thereof, the apparatus comprising:
   first driving means for driving the head in a radial direction of the floppy disc;
   second driving means for rotating the floppy disc;
   first controlling means for controlling said first driving means so as to move the head across the data tracks to the non-data region of the floppy disc when data accessing to the floppy disc is completed; and
   second controlling means for controlling said second driving means to rotate the floppy disc for a first predetermined time period at an interval of a second predetermined time period when data accessing to the floppy disc is not executed to prevent absorption between the head and the floppy disc surface.

2. The floppy disc drive apparatus of claim 1 wherein said first driving means comprises a step motor.

3. The floppy disc drive apparatus of claim 1 wherein said first controlling means includes means for detecting a track position of the head on the floppy disc, calculating means for calculating a number of the floppy disc data tracks crossed by the head up to a predetermined track in the non-data region according to said detected track position and a control unit for supplying a signal, representing said calculated number of floppy disc tracks crossed, to said first driving means so as to control movement of the head in the radial direction of the floppy disc.

4. The floppy disc drive apparatus of claim 1 wherein said second controlling means includes a timer circuit for outputting a signal at intervals of a predetermined time period and a control unit for driving said second driving means intermittently in response to an output of said timer circuit.

5. A floppy disc drive apparatus having an absorption preventing function for preventing absorption between a head and a surface of a floppy disc wherein the head is in contact with the surface of the floppy disc when the floppy disc is driven, the floppy disc including data storage tracks and a non-data region located at an inner diameter portion thereof, said apparatus comprising:
   first driving means for driving the head in a radial direction of the floppy disc;
   second driving means for rotating the floppy disc; and
   controlling means for controlling said first driving means to move the head to the non-data region when data accessing to the floppy disc is completed and for controlling said second driving means to rotate intermittently at an interval of a predetermined time period when the head is in the non-data region and data accessing to the floppy disc is not executed, to prevent absorption between the head and the floppy disc surface.

6. The floppy disc drive apparatus of claim 5 wherein said first driving means comprises a step motor.

7. The floppy disc drive apparatus of claim 5 wherein said controlling means further comprises means for detecting a track position of the head on the floppy disc, calculating means for calculating the number of tracks crossed by the head up to a predetermined track in the non-data region according to the detected track position, a control unit for supplying a signal, representing said calculated number of data tracks crossed, to said first driving means to control movement of the head in the radial direction of the floppy disc, a timer circuit for outputting a signal at intervals of a predetermined time period and a control unit for driving the second driving means intermittently in response to said signal of said timer circuit.

8. A method of controlling a floppy disc drive apparatus having an absorption preventing function for preventing absorption between a head and a surface of a floppy disc wherein the head contacts a surface of the floppy disc, the floppy disc drive apparatus comprising a first driving means for driving the head in a direction radial to the floppy disc and a second driving means for rotating the floppy disc, the floppy disc including data tracks and a non-data region at an inner diameter portion thereof, the method comprising the steps of:

actuating the first driving means to move the head across the data tracks to the non-data region when data accessing to the floppy disc is completed;

stopping the first driving means to retain the head in the non-data region of the floppy disc;

actuating the second driving means for a first predetermined time period at an interval of a second predetermined period while the head is in the non-data region when data accessing to the floppy disc is not executed to prevent absorption between the head and the floppy disc surface.

9. The method of claim 8 further comprising the steps of detecting a track position of the head on the floppy disc, calculating a number of the floppy disc data tracks crossed by the head up to a predetermined track in the non-data region according to said detected track position and supplying a signal representing the calculated number of floppy disc tracks crossed, to said first driving means to control movement of the head in the radial direction of the floppy disc.

* * * * *